March 14, 1944. T. McG. AIKEN 2,344,382
CAMERA
Filed Nov. 14, 1941 2 Sheets-Sheet 1
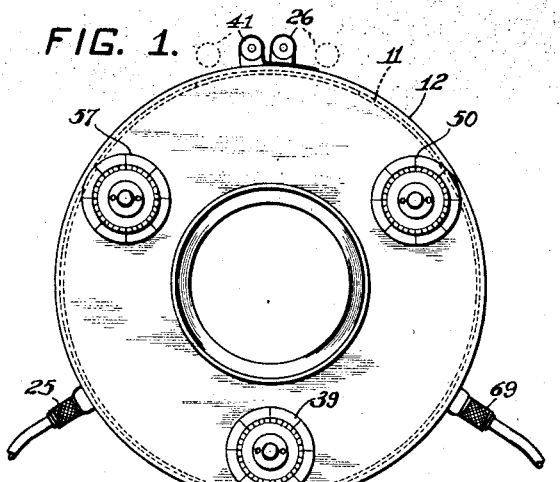
FIG. 1.
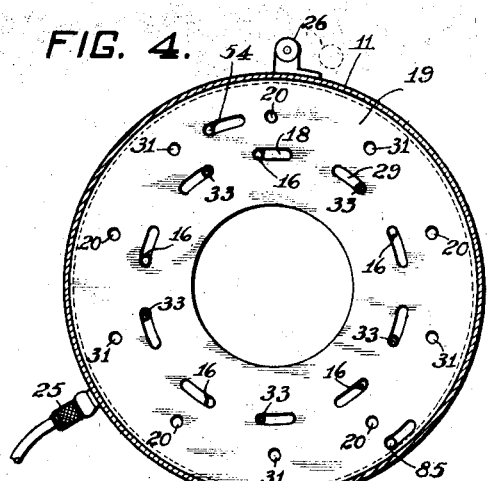
FIG. 4.
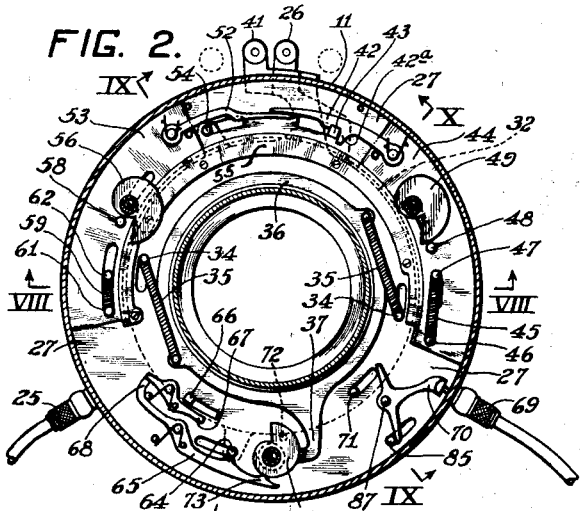
FIG. 2.
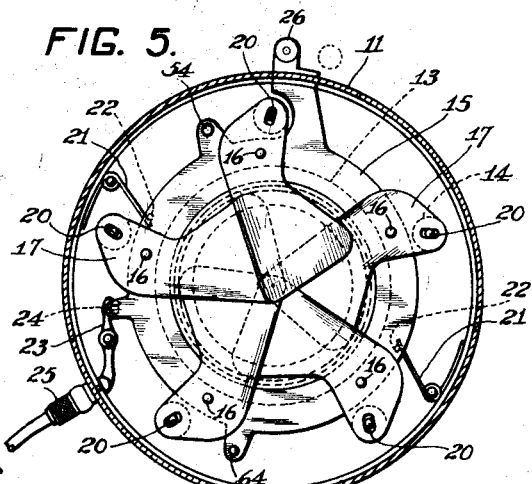
FIG. 5.
FIG. 5A.
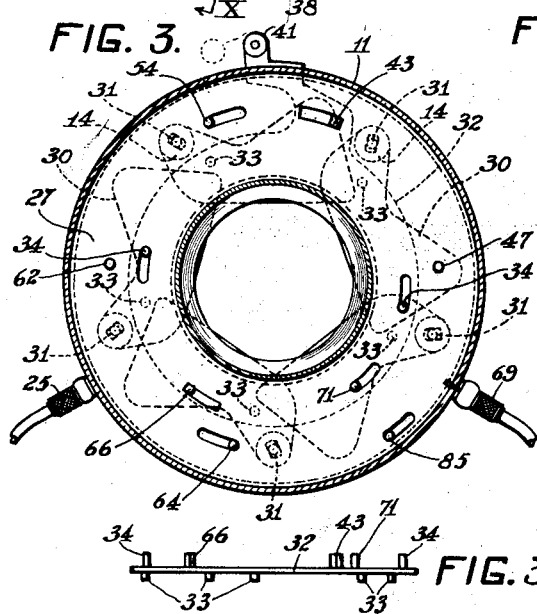
FIG. 3.
FIG. 3A.
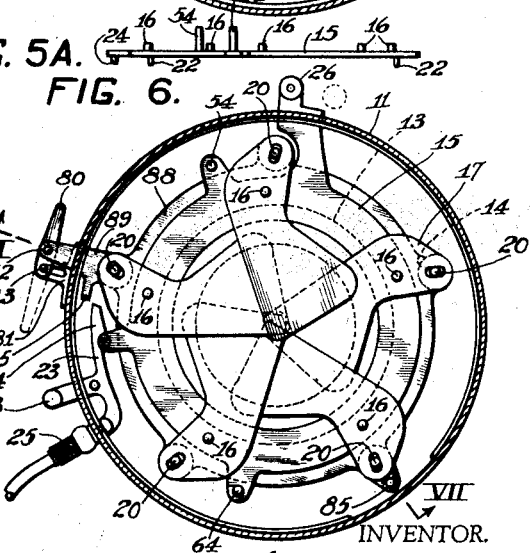
FIG. 6.
INVENTOR.
Thomas McG. Aiken
by Archworth Martin
ATTORNEY.

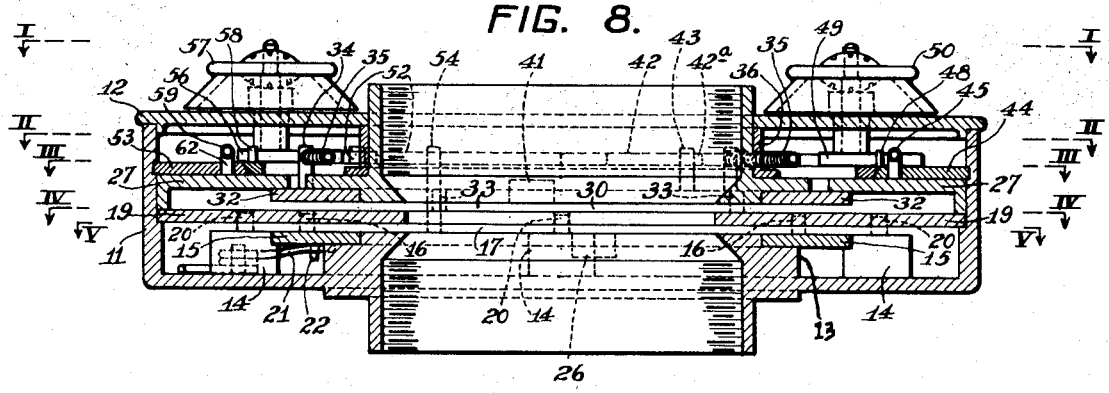
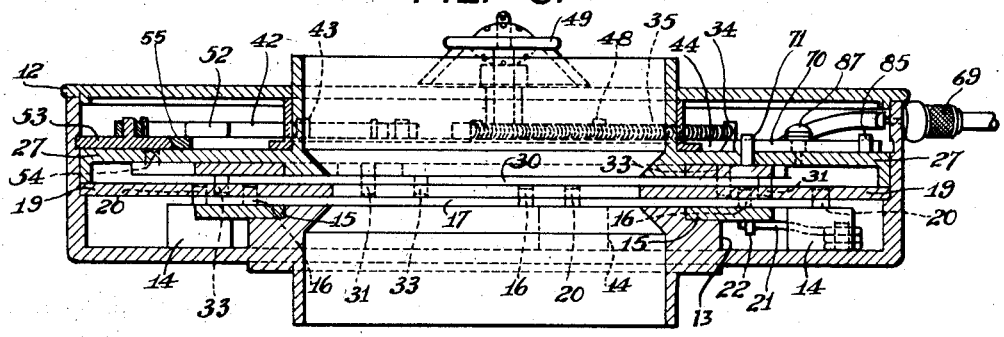
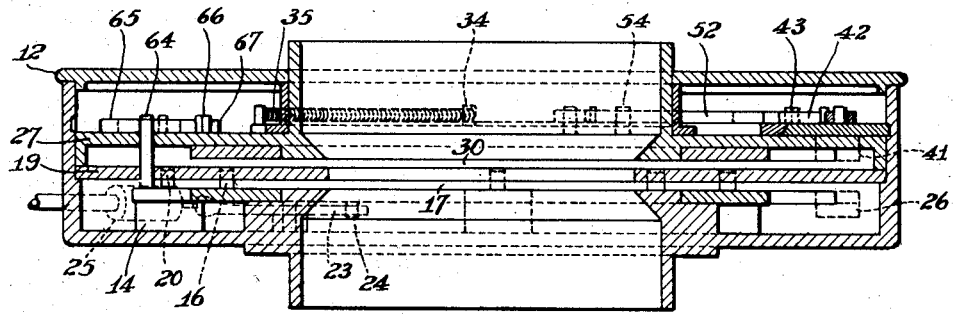
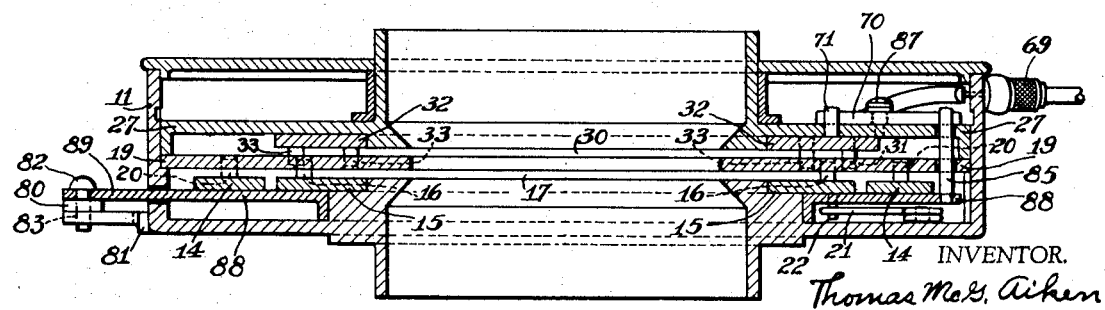

Patented Mar. 14, 1944

2,344,382

UNITED STATES PATENT OFFICE 2,344,382

CAMERA

Thomas McG. Aiken, Pittsburgh, Pa.

Application November 14, 1941, Serial No. 419,101

16 Claims. (Cl. 95—63)

My invention relates to cameras and more particularly to an improved shutter and diaphragm arrangement and mechanism for operating them.

One object of my invention is to provide shutter apparatus and operating mechanism therefor, of such construction that exposures can be made more quickly than has heretofore been possible with cameras of this type.

Another object of my invention is to provide a diaphragm and operating mechanism therefor of such form and arrangement that the blades or wings of the diaphragm will cooperate with the shutter, to limit the duration of exposure.

Still another object of my invention is to provide camera apparatus having two sets of blades that are operated in a desired timed relation relative to one another, one set being movable to make an opening for an exposure, and the other set being movable to close off the light.

This invention constitutes an improvement upon that of my Patent 2,168,893, in that it provides for shorter exposures than is possible with the apparatus of said patent, because while the patent has two shutter-actuating rings that are tensioned for successive operation to effect an opening and closing cycle of a shutter, the present invention provides a set of shutter blades for each ring, the shutter-actuating rings in the present case being both placed under tension in such manner that release of one ring will cause one set of blades to open, and during such opening movement the other ring will automatically be tripped to thereby cause the other set of blades to be closed.

The present invention is also an improvement over that of my application Ser. No. 384,434, filed March 21, 1941, in that in the present case the diaphragm blades that are controlled through movement of a shutter-operating ring will also serve as a shutter, because they can be caused to move to fully-closed position through opening movement of the shutter-operating ring. Also, the shutter can be opened for focusing when under operating tension, as in Patent No. 2,168,893, and the diaphragm can be opened fully as in application Ser. No. 384,434, when the shutter is opened to focus. When the shutter is opened for focusing, the tripping lever for releasing it is locked and cannot be released until after the shutter has been closed.

As shown in the accompanying drawings, Figure 1 is a face view looking in the direction of the arrows I—I of Fig. 8, but on a reduced scale, of a shutter casing and lens cell embodying my invention; Figs. 2 and 3 are views on a reduced scale taken on the lines II—II and III—III respectively of Fig. 8; Fig. 3a is an edge view of one of the shutter-operating rings; Figs. 4 and 5 are views on a reduced scale, taken on the lines IV—IV and V—V respectively, of Fig. 8, but with the shutter blades in place; Fig. 5a is an edge view of the other shutter-operating ring; Fig. 6 is a view similar to Fig. 5, but showing a modification thereof; Fig. 7 is a view taken on the line VII—VII of Fig. 6; Figs. 8, 9 and 10 are enlarged sectional views taken on the lines VIII—VIII, IX—IX and X—X respectively, of Fig. 2, but with the shutter blades omitted.

The shutter casing is indicated by the numeral 11 and is provided with a cover plate or cap 12 at its outer end. The inner end wall of the casing has an annular shoulder 13 and bosses 14 formed thereon. A shutter ring 15 (Figs. 5 and 5a) is supported for oscillatory movements on the shoulder 13 and carries five studs 16 that extend through shutter blades 17 and through arcuate slots 18 in a partition plate 19. The blades 17 have slots near their outer ends through which extend studs 20 that are formed on the bosses 14. It will be seen that when the ring 15 is oscillated about its center, the shutter blades will be opened and closed. Springs 21 (Fig. 5) bear against the casing wall and against studs 22 on the ring 15, to urge the blades 17 toward open position. A latch 23 is pivoted on the inner end wall of the casing and engages a stud 24 on the rear side of the ring 15, to hold the ring and the blades closed against the tension of the springs 21. The latch 23 is tripped by a cable or finger release 25 to release the ring 15 for opening movement of the shutter blades. The shutter ring has a handle-like extension 26 by which it can be rocked to its tensioned (closed) position at which it is held by the latch 23.

A flanged partition 27 is positioned against the outer face of the plate 19. These members are rigidly held against movement in the casing by suitable screws (not shown).

A second set of shutter blades 30 are provided (Fig. 3) that are mounted and operated in a manner similar to the shutter blades 17. These blades may also be employed in a manner similar to a diaphragm. The blades 30 are located in the space between the partitions 19 and 27, and near their outer ends have slots through which studs 31 extend, these studs being held in the partition 27 (Figs. 3 and 9). A shutter-operating ring 32 has oscillatory movement in the case in overlying relation to the blades 30, and has studs 33 (Figs. 3A, 8, 9) that project rearwardly through the blades and through slots 29 in the partition 19 (Fig. 4), so that as the ring oscillates it will swing the blades to open and closed positions.

The ring 32 carries studs 34 that extend through slots in the partition 27 and at their upper ends have connection with tension springs 35 whose other ends are connected to a collar 36 that has an arm 37 (Fig. 2) which bears against an adjustable stop 38 that is rotatably adjusted from the front of the casing, by a turn-button 39. The springs acting through the ring 32 constantly pull the blades 30 toward closed position. The setting of the cam 38 regulates the degree of tension on the springs when the ring 32 is moved clockwise (Figs. 2 and 3) to open the shutter 30, and hence determines the speed at which the shutter will close when the ring is released. The ring 32 has an arm 41 that is moved clockwise from the dotted line position (Figs. 2-3) to the full line position, to open the blades 30 against the tension of the springs 35.

The shutter ring 32 is held in its open position by a spring-held latch 42 that engages a stud 43 that projects forwardly from the ring. The latch 42 is pivotally mounted on a segmental plate 44 that is adjustable in the casing, in a circumferential direction. A spring 45 is connected at one end to a stud 46 on the plate 44 and at its other end to a stud 47 carried by the partition 27 and extending through a slot in the plate 44. A stud 48 is carried by the segmental plate 44 and has abutting engagement with a cam stop 49 that is pivoted on the inside of the cover plate 12 and is rotatably adjustable by a turning dial 50. The spring 45 urges the plate 44 in a counter-clockwise direction, a distance determined by the setting of the cam 49 and, therefore, determines the position of the latch 42, and hence the point at which it will hold the stud 43 and the ring 32. With the parts as shown in Figs. 2 and 3, the blades 30 are wide open, but if the cam 49 be turned in a clockwise direction for some distance, the plate 44 and the latch 42 will be moved by the spring 45 in a counter-clockwise direction to cause the stud to be held at a point farther toward the left, and hence to maintain the blades 32 at less than their full-open position.

A tripping lever 52 for the latch 42 is mounted on a segmental plate 53, and the partition 27 has a slot through which extends a stud 54 that is carried by the shutter ring 15. When the shutter ring 15 moves in a clockwise direction in opening the blades 17, the stud 54 will lift the lever 52 and the latch 42, thereby allowing the springs 35 to close the shutter blades 30. The point at which the latch 42 is tripped by movement of the ring 15 is determined by the setting of a cam stop 56 rotatably mounted on the cover plate 12 and operated by a turning dial 57. The segment has a stud 58 held in abutting engagement with the cam stop 56, by a spring 59, one end of which is connected to a stud 61 on the segment and the other end to a stud 62 carried by the partition 27 and extending through a slot in the plate 53. The circumferential adjustment of the plate 53, and hence of the lifting lever 52, is determined by the setting of the cam 56. The lever 52 will thus be lifted by the stud 54 at an earlier or later stage in the travel of the ring 15 toward open-shutter position with the blades 17, so that closing movement of the blades 30 can begin at any stage during opening movement of the blades 17. As shown in Figs. 2 and 9, a retaining strip 55 screwed to partition 27, holds the segments 44 and 53 in position on the partition 27.

When the parts are in the position shown in the drawing, they are ready for the snapping of a picture. Thereupon, the cable release 25 is actuated to trip the latch 23, which permits the shutter blades 17 to be snapped open by their springs 21, the movement of the ring 15 tripping the diaphragm latch 42 as above explained, allowing the diaphragm blades 30 to be closed by the springs 35. For retarded exposures, any well-known device may be used to retard the movement of the blades 30 when they are closing to complete an exposure, one form of such device being shown in my Patent No. 2,168,893. This movement moves a stud 64 that is carried by the ring 15 to the left along the long finger of a latch 65. During closing of the diaphragm blades 30, a stud 66 carried by the ring 32 moves past a spring-pressed dog or latch 67 that is pivoted on the partition plate 27. The dog 67 will spring in behind the stud 66, so that the ring 32 cannot be swung clockwise to open the blades 30, until after the latch 65 has been raised through movement of the stud 64 to the position shown in Fig. 2, where the blades 17 are closed. This snapping in of the dog 67 behind the stud 66 serves also as a safety device to prevent rebound or slight bouncing open of the blades 30 when they snap closed.

In setting the parts for another operation, that is, closing the shutter 17 and opening the diaphragm 30, the handles 26 and 41 are moved from their dotted line positions (Figs. 1 and 2) to their full line positions. The handles can be grasped between the fingers and squeezing pressure applied. Since the dog 67 holds the stud 66 and the ring 32 against clockwise movement, only the handle 26 will be moved at that time, such movement of the handle causing the stud 64 and its ring 15 to be swung in a counter-clockwise direction, thus closing the blades 17. The stud 64 is thereby moved to swing the nose of the latch 65 outward and its tail piece 68 inward to release the dog 67. At this time, the blades 17 have reached their closed position, so that further compressive movement by the fingers of the operator will cause the handle 41 to swing in a clockwise direction carrying with it the ring 32 and the stud 66 until the ring is engaged and held by the latch 42. Danger of accidental admission of light to a plate that is ready for exposure is thereby avoided.

The blades 30 serve as both a diaphragm and a shutter. They can be set at a desired diameter of opening by the cam stop 49, for exposure when the shutter blades move to open position, and will then close at a desired stage in the opening movement of the blades 17, to entirely cut off the light.

Faster exposures can be made with my apparatus than in those devices wherein exposure is made by a complete cycle of opening and closing movement by shutter blades, because in these other devices not only is time consumed in reversing the motion of the blades from opening to closing movements, but the cutting off of the light cannot begin until after the blades have moved to their full-open positions. By my arrangement, no time is lost in reversing the movement of the blades, because the blades 30 can be tripped just before the blades 17 reach open position. Again, the setting of the cam stop 56 can be such that the blades 30 can be tripped at any point in the opening travel of the blades 17, so that they can reach closed position either before or at the instant the blades 17 reach full open position, or at a desired interval thereafter which is shorter than would be required for the blades 17 to reverse and close. I can make exposures in a time as short as one-thousandth of a second, as compared to shutters operated through an opening and closing cycle and which cannot make exposures of less than perhaps 1/300 of a second.

In order to permit of "time" and "bulb" operations of the camera, I provide a cable or bulb release exposure device 69 of any suitable form that operates against a spring-pressed lever 70 which is pivotally mounted in the casing. When the blades 30 are in closed position, a stud 71 carried by the ring 32 and extending through the partition plate 27 has engagement with the inner arm of the lever 70, so that upon actuation of the cable release 69, the lever 70 will be swung to push the stud 71 and the ring 32 in a clockwise direction against the pull of the springs 35, to open the blades 30 to a point where stud 43 will strike extension 42a on the latch 42, which will determine the aperture of opening as adjusted by the cam 49, the blades being returned to closed-shutter position, by release of the actuating member 69.

To prepare for the operation just described, the latch 23 is disengaged from the shutter ring 15, allowing the blades 17 to be held open by their springs and the diaphragm to be closed by the springs 35. The cam 38 is then turned, so that a pin 72 on its rear side will engage beneath the extension 73 of the latch 65 and push the latch outwardly, so that the dog 67 is moved clear of the stud 66, thus permitting the ring 32 and the diaphragm blades 30 to be actuated by the device 69, for time and bulb exposures. The turning of the stop 38 to the position just mentioned, permits the tensioning ring 36 to be moved in a clockwise direction by the springs 35, thus reducing the tension on the shutter ring 32, which is desirable when making time and bulb exposures.

Referring now to Figs. 6 and 7, I show an arrangement for apparatus especially suitable for use on cameras of the focusing type. This apparatus comprises means whereby the shutter and the diaphragm can be opened simultaneously, for focusing, after the shutter 17 has been set in tensioned (closed) operating position, without disarranging any operating parts or making any readjustments. To accomplish this, I provide a ring 88 under the ring 15. This ring 88 carries the bosses 14 and their studs 20. The ring 88 is shifted by movement of a lever 80. The lever 80 is pivotally mounted at 82 on an arm or extension 89 of the ring 88, and has a pin 83 that engages a slot in a bracket 81 that is secured to the wall of the case 11.

When the lever 80 is swung counter-clockwise to its dotted line position, the ring 88 and the studs 20 will be shifted counter-clockwise, to open the blades 17, since the ring 15 will be held stationary—under tension— by the latch 23. During this movement, a stud 85 on the ring 88 will engage the lever 70 which will thus be moved against the stud 71 and move the ring 32 in a clockwise direction. This movement is transmitted through stud 43 and latch 42, to the segment 44, so that the diaphragm blades 30 will be moved wide open—no matter at what position the diaphragm stop cam 49 is set.

Both the shutter 17 and the diaphragm 30 are then wide open for focusing. When the lever 80 is then swung to its full line position, the shutter 17 will be moved closed and the diaphragm blades will be pulled by their springs 35 toward closed position a distance limited by the setting of the cam 49. The parts are then ready for the taking of a picture, since tripping of the latch 23 will release the ring 15 for opening movement of the blades 17 and the latch 42 will be tripped for closing of the blades 30, as above explained.

In order to insure against accidental tripping of the latch 23 when the lever 80 is operated to open the blades 17 for focusing, I provide an extension 95 on the ring 88, which moves over an extension 94 of the latch 23, thus preventing accidental release of the ring 15 when the blades 17 are open in focusing position. The extension 95 serves as a stop that is in position to abut the end 94 of the latch 23 when the latch is in released position, thereby preventing operation of the lever 89 if the shutter is not under operating tension. 93 is a finger release extending through the side wall of the casing from the latch 23, so that the latch can be tripped either by this member or be operated by the cable release.

The term "iris type" as used in the accompanying claims refers to a shutter or diaphragm composed of blades or wings that are relatively expanded and contracted with relation to a given central point, or focusing axis.

I claim as my invention:

1. Exposure apparatus for cameras, comprising shutter blades, a member movable to open and close the blades, a spring for normally yieldably urging said member to open-shutter position, a second set of shutter blades, a member movable to open and close these blades, a spring for normally yieldably urging the last-named member to closed-shutter position, a latch for holding the first-named member in closed-shutter position, against its spring tension, a latch for holding the second-named member in open-shutter position, against its spring tension, and a tripping device for automatically releasing the second-named latch after release of the first-named latch.

2. Exposure apparatus for cameras, comprising shutter blades, a member movable to open and close the blades, a spring for normally yieldably urging said member to open-shutter position, a second set of shutter blades, a member movable to open and close these blades, a spring for normally yieldably urging the last-named member to closed-shutter position, a latch for holding the first-named member in closed-shutter position, against its spring tension, a latch for holding the second-named member in open-shutter position, against its spring tension, and a tripping device actuated through movement of the first-named member to open-shutter position, upon release of its latch, for releasing the second-named latch.

3. Exposure apparatus for cameras, comprising shutter blades, a member movable to open and close the blades, a spring for normally yieldably urging said member to open-shutter position, a second set of shutter blades, a member movable to open and close these blades, a spring for normally yieldably urging the last-named member to closed-shutter position, a latch for holding the first-named member in closed-shutter position, against its spring tension, a latch for holding the second-named member in open-shutter position, against its spring tension, and a tripping device actuated through movement of the first-named member to open shutter position, upon release of its latch, for releasing the second-named latch, the said tripping device being adjustable along the path of movement of the first-named member to open-shutter position.

4. Exposure apparatus for cameras, comprising a shutter of the iris type, a diaphragm of the iris type, a spring for normally holding the shutter open, means for latching the shutter in closed position against its spring tension, a spring for closing the diaphragm, means for latching the diaphragm in open position against its spring tension, and means movable with the shutter and operated through opening movement thereof upon release of its latch, for releasing the diaphragm, the diaphragm being movable to completely close the exposure opening of the camera.

5. Exposure apparatus for a camera having an exposure opening, comprising a shutter of the iris type, a diaphragm of the iris type, a spring for normally holding the shutter open, means for latching the shutter in closed position against its spring tension, a spring for closing the diaphragm, means for latching the diaphragm in open position against closing tension, means movable with the shutter and operated through opening movement of the shutter upon release of its latch, for releasing the diaphragm, the diaphragm being movable to completely close the exposure opening of the camera, and adjustable means for limiting the area of diaphragm opening.

6. Exposure apparatus for cameras, comprising shutter blades, a member movable to open and close the blades, a spring for yieldably urging said member to open-shutter position, a second set of shutter blades, a member movable to open and close these blades, a spring for yieldably urging the last-named member to closed-shutter position, a safety latch automatically engageable with the last-named member upon closing of the last-named blades, for holding it in closed-shutter position, a tripping element actuated by manual movement of the first-named member to closed-shutter position, to trip the latch, whereby said last-named member is released for movement manually toward open-shutter position after the first-named shutter blades have been manually closed, a latch for releasably holding the first-named blades in closed position, a latch for releasably holding the second-named blades in open position, and means for automatically releasing the last-named latch at a predetermined interval after the latch for the first-named blades has been released.

7. Exposure apparatus for cameras, comprising shutter blades, a member movable to open and close the blades, a spring for yieldably urging said member to open-shutter position, a second set of shutter blades, a member movable to open and close these blades, a spring for yieldably urging the last-named member to closed-shutter position, a latch for releasably holding the first-named blades in closed position, a latch for releasably holding the second named blades in open position, means for automatically releasing the last-named latch at a predetermined interval after the latch for the first-named blades has been released, and means for preventing rebound of the second-named blades at the end of their closing movement.

8. Exposure apparatus for cameras, comprising a shutter, a member movable to operate the shutter, a spring for yieldably urging said member to open-shutter position, a second shutter having an operating member with a spring for yieldably urging it to closed-shutter position, a latch for holding the first-named member in closed-shutter position, a latch for holding the second-named member in open-shutter position, a device for opening and closing the first-named shutter, when focusing, while the latches are in their said holding positions, and means for thereafter tripping the said latches, to make an exposure.

9. Exposure apparatus for cameras, comprising a shutter, a member movable to operate the shutter, a spring for yieldably urging said member to open-shutter position, a second shutter having an operating member with a spring for yieldably urging it to closed-shutter position, a latch for holding the first-named member in closed-shutter position, a latch for holding the second-named member in open-shutter position, a device for opening and closing the first-named shutter, when focusing, while the latches are in their said holding positions, means for preventing operation of the said device when the first-named latch is in released position, and means for tripping the said latches to make an exposure.

10. Exposure apparatus for cameras, comprising a shutter, a member movable to operate the shutter, a spring for yieldably urging said member to open-shutter position, a second shutter having an operating member with a spring for yieldably urging it to closed-shutter position, a latch for holding the first-named member in closed-shutter position, a latch for holding the second-named member in open-shutter position, a device for opening and closing the first-named shutter, when focusing, while the latches are in their said holding positions, means for preventing tripping of the first-named latch when the said device is in open-shutter position, and means for tripping the latches, after completion of the operation of said device.

11. Exposure apparatus for cameras, comprising a shutter, a spring for opening the shutter, means for releasably holding the shutter in closed position, a second shutter which serves also as a diaphragm, a spring for closing the same, means for releasably holding the second-named shutter at a diaphragm stop position, a device for opening and closing the first-named shutter, when focusing, and for simultaneously opening the second-named shutter to its widest diameter and returning it to its stop position, and means for thereafter disengaging both of said holding means to thereby affect opening of the first-named shutter and closure of the second-named shutter, to make an exposure.

12. Exposure apparatus for cameras, comprising shutter blades, a member movable to open and close the blades, a spring for normally yieldably holding said member in open-shutter position, a second set of shutter blades, a member movable to open and close these blades, a spring for normally yieldably holding the last-named member in closed-shutter position, a latch for holding the first-named member in closed-shutter position, a latch for holding the second-named member in open-shutter position, a tripping device for automatically releasing the second-named latch after release of the first-named latch, means for resetting the first-named member in closed-shutter position, means for resetting the second-named member in open shutter position, and a stop device arranged to prevent resetting of the second set of blades in open shutter position until after the first-named blades have been reset at their closed position, whereby exposures are had only through opening movement of the first-named blades and closing movement of the second-named blades.

13. Exposure apparatus for cameras, comprising shutter blades, a member movable to open and close the blades, a spring for normally yieldably holding said member in open-shutter position, a second set of shutter blades, a member movable to open and close these blades, a spring for normally yieldably holding the last-named member in closed-shutter position, a latch for holding the first-named member in closed-shutter position, a latch for holding the second-named member in open-shutter position, a tripping device for automatically releasing the second-named latch after release of the first-named latch, means for resetting the first-named member in closed-shutter position, means for resetting the second-named member in open-shutter position, and a stop device arranged to prevent resetting of the second set of blades in open-shutter position until after the first-named blades have been reset at their closed position, whereby exposures are had only through opening movement of the first-named blades and closing movement of the second-named blades, the said stop being moved to its operative and inoperative positions by opening and closing movements, respectively, of the first-named member.

14. Exposure apparatus for cameras, comprising a shutter of the iris type, a spring for normally holding the shutter open, a second shutter of the iris type having a spring for normally holding it closed, a member manually movable to close the first-named shutter against its spring tension, a latch for releasably holding it closed, a member manually movable to open the second-named shutter against its spring tension, a latch for releasably holding it open, a stop element arranged to hold the second named shutter against opening movement, while the first named shutter is open, and means for automatically moving the stop element to inoperative position through closing movement of the first-named shutter.

15. Exposure apparatus for cameras, comprising a shutter of the iris type, a spring for normally holding the shutter open, a second shutter of the iris type having a spring for normally holding it closed, a member manually movable to close the first-named shutter against its spring tension, a latch for releasably holding it closed, a member manually movable to open the second-named shutter against its spring tension, a latch for releasably holding it open, means for automatically tripping the second-named latch after release of the first-named latch, to allow the springs to move the shutters, and means for retaining the second named member against movement to its open-shutter position until the first-named member has been moved to its closed-shutter position, when performing the steps of resetting the shutters under spring tension.

16. Exposure apparatus for cameras, comprising shutter blades with a spring for yieldably urging them to open position, a latch for holding them closed, a second set of shutter blades with a spring for yieldably urging them to closed position, a manually-actuated member for opening the second set of blades independently of movement of the first-named blades, a latch for holding the second-named blades open, and a member associated with the first-named blades, for holding the last-named latch in release position when the first-named blades are open, whereby the second-named shutter can be manually operated independently of the first-named shutter, and means operated through opening movement of the first-named blades, upon release of their latch, when the second-named blades are held open by the second-named latch, to trip the last-named latch.

THOMAS McG. AIKEN.